(12) United States Patent  
Wright et al.

(10) Patent No.: US 9,171,253 B1  
(45) Date of Patent: Oct. 27, 2015

(54) IDENTIFYING PREDICTIVE MODELS RESISTANT TO CONCEPT DRIFT

(71) Applicant: Symantec Corporation, Mountain View, CA (US)

(72) Inventors: Adam Wright, Los Angeles, CA (US); Sourabh Satish, Fremont, CA (US); Jeffrey Wilhelm, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 238 days.

(21) Appl. No.: 13/755,443

(22) Filed: Jan. 31, 2013

(51) Int. Cl.
*G06N 5/02* (2006.01)
(52) U.S. Cl.
CPC .......................................... *G06N 5/02* (2013.01)
(58) Field of Classification Search
None
See application file for complete search history.

(56) References Cited

U.S. PATENT DOCUMENTS 7,630,950 B2 * 12/2009 Wang et al. ................... 706/48
7,930,353 B2 * 4/2011 Chickering et al. .......... 709/206
2005/0192824 A1 * 9/2005 Schuetze et al. ............... 705/1
2010/0161652 A1 * 6/2010 Bellare et al. ............... 707/769
2012/0054184 A1 * 3/2012 Masud et al. ................ 707/737
2014/0304200 A1 * 10/2014 Wall ............................... 706/12

OTHER PUBLICATIONS

Wang, Haixun, et al, "Mining Concept Drifting Data Streams using Ensemble Classifiers" ACM 2003.*

* cited by examiner

*Primary Examiner* — Kakali Chaki
*Assistant Examiner* — Isidore Sobkowski
(74) *Attorney, Agent, or Firm* — Fenwick & West LLP (57) ABSTRACT

A plurality of classifiers is identified. A set of test cases is selected based on time. The set of test cases are grouped into a plurality of datasets based on time where each of the plurality of datasets is associated with a corresponding interval of time. Each of the plurality of classifiers is applied to each of the plurality of datasets to generate classifications for test cases in each of the plurality of datasets. For each of the plurality of classifiers, a classification performance score is determined for each of the plurality of datasets based on the classifications generated for the test cases of each dataset. A classifier is selected from among the plurality of classifiers for production based on the classification performance scores of each of the plurality of classifiers across the plurality of datasets.

18 Claims, 4 Drawing Sheets

IDENTIFYING PREDICTIVE MODELS RESISTANT TO CONCEPT DRIFT

BACKGROUND

1. Technical Field

The following disclosure pertains in general to computer security and particularly to identifying predictive security models that are resistant to concept drift.

2. Description of the Related Art

In predictive analytics and machine learning, classification systems are trained to identify a target property. For example, these classification systems may be trained to identify a wide variety of malicious software (malware) that can attack modern computers. These malware threats include computer viruses, worms, Trojan horse programs, spyware, adware, crimeware, and phishing websites.

However, the target property that the classification systems are trained to classify are typically time dependent. That is, the target property that the classification systems are trained to identify may change over time; this is referred to as concept drift. As the target property changes, the predictions of the classification systems become less accurate over time. Furthermore, as updates to the classification system are made, it is difficult to determine how the updates impact the predictions of the classification systems. Accordingly, it is difficult to determine how changes to classification systems that are sensitive to concept drift impact the classification performance of the classification systems.

BRIEF SUMMARY

The above and other issues are addressed by a computer-implemented method, a computer program product, and a computer system for selecting a classifier for production. In one embodiment, the method comprises identifying a plurality of classifiers. A set of test cases is selected based on time. The set of test cases are grouped into a plurality of datasets based on time where each of the plurality of datasets is associated with a corresponding interval of time. Each of the plurality of classifiers is applied to each of the plurality of datasets to generate classifications for test cases in each of the plurality of datasets. For each of the plurality of classifiers, a classification performance score is determined for each of the plurality of datasets based on the classifications generated for the test cases of each dataset. A classifier is selected from among the plurality of classifiers for production based on the classification performance scores of each of the plurality of classifiers across the plurality of datasets.

An embodiment of the computer program product comprises a non-transitory computer-readable storage medium including executable code. The code when executed performs steps. The steps include identifying a plurality of classifiers. A set of test cases is selected based on time. The steps group the set of test cases into a plurality of datasets based on time where each of the plurality of datasets is associated with a corresponding interval of time. Each of the plurality of classifiers is applied to each of the plurality of datasets to generate classifications for test cases in each of the plurality of datasets. For each of the plurality of classifiers, the steps determine a classification performance score for each of the plurality of datasets based on the classifications generated for the test cases of each dataset. The steps select a classifier from among the plurality of classifiers for production based on the classification performance scores of each of the plurality of classifiers across the plurality of datasets.

An embodiment of the computer system comprises a processor and a computer-readable storage medium including executable code. The code when executed by the processor performs steps comprising identifying a plurality of classifiers. A set of test cases is selected based on time. The steps group the set of test cases into a plurality of datasets based on time where each of the plurality of datasets is associated with a corresponding interval of time. Each of the plurality of classifiers is applied to each of the plurality of datasets to generate classifications for test cases in each of the plurality of datasets. For each of the plurality of classifiers, the steps determine a classification performance score for each of the plurality of datasets based on the classifications generated for the test cases of each dataset. The steps select a classifier from among the plurality of classifiers for production based on the classification performance scores of each of the plurality of classifiers across the plurality of datasets.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
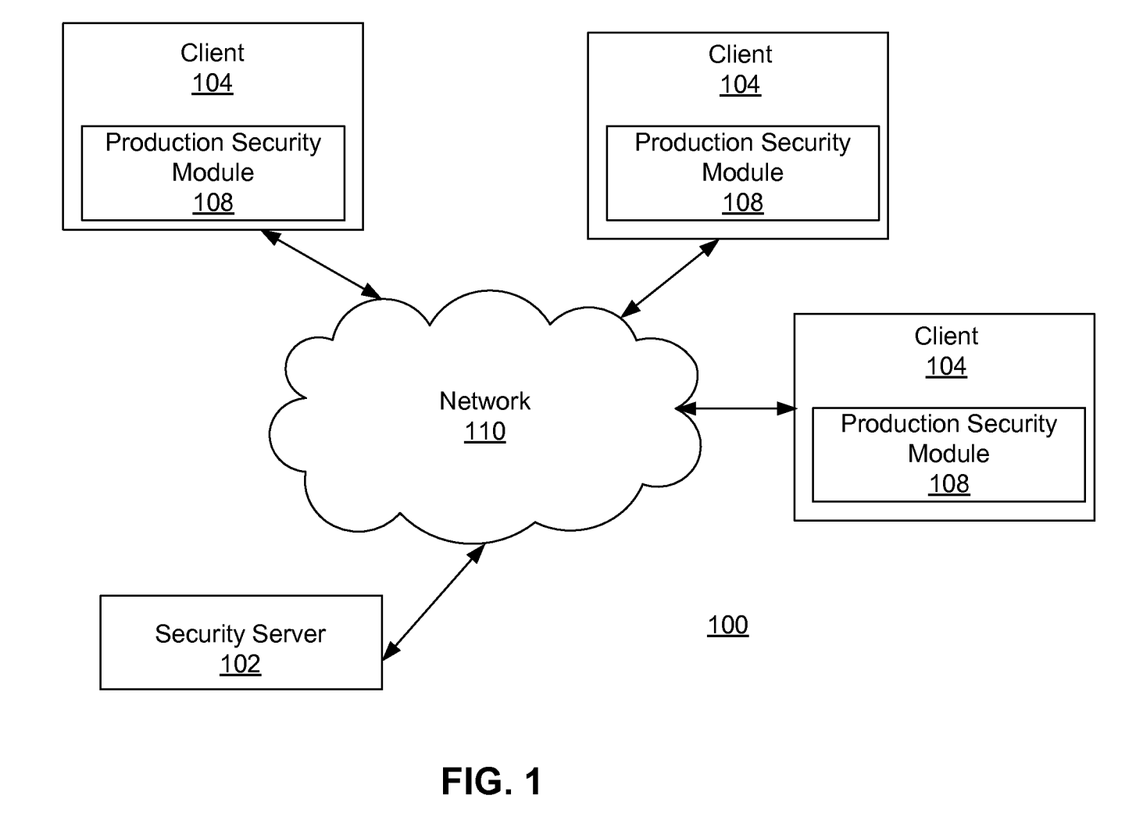
FIG. 1 is a high-level block diagram of a computing environment according to one embodiment.

FIG. 1 is a high-level block diagram of a computing environment 100 according to one embodiment. FIG. 1 illustrates a security server 102 and three clients 104 connected by a network 110. Only three clients 104 are illustrated in FIG. 1 in order to simplify and clarify the description. Embodiments of the computing environment 100 can have thousands or millions of clients 104. Some embodiments also have multiple security servers 102.

In one embodiment, the clients 104 are electronic devices that can host malicious software. A client 104 may be a conventional computer system executing, for example, a MICROSOFT WINDOWS compatible operating system (OS), APPLE OS X, and/or a LINUX distribution. A client 104 can also be another device having computer functionality, such as a tablet computer, mobile telephone, video game system, etc. The client 104 typically stores numerous computer files that can host malicious software.

Malicious software, sometimes called "malware," is generally defined as software that executes on a client 104 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The clients 104 execute production security modules 108 for detecting the presence of malware on the clients. A production security module 108 can be incorporated into the OS of a client 104 or part of a separate comprehensive security package. In one embodiment, the production security module 108 is provided by the same entity that operates the security server 102. The security module 108 communicates with the security server 102 via the network 110 to obtain updated versions of the production security module currently residing on the client 104.

In one embodiment, an updated version of the production security module 108 includes one or more revisions to the production security module 108 that may impact the performance of the production security module. For example, updated detection data used to identify malware may be included in an updated version of the production security module 108. The updated detection data includes updated malware signatures. In one embodiment, a malware signature describes attributes of malware that can be used to detect an instance of the malware at the client 104. The attributes may include a string signature that identifies a sequence of data found in computer files that are characteristic of the malware and a sequence of behaviors that are performed by the malware when executing at the client 104.

The detection data may also include data that describe other ways to detect malware at the client 104, such as updated reputations that the production security module 108 can use to evaluate whether a given piece of software is malware, and/or updated heuristics that identify states of the client that are likely to indicate a malware attack. The updated versions of the production security module 108 may include other types of updates to the production security module such as fixes to any software bugs in the production security module.

In one embodiment, the production security module 108 monitors the client 104 using the detection data and generates a report if it detects malware. The report notifies a user of the client 104 and/or another entity, such as an administrator of the client, of the detected malware. Thus, the production security module 108 operates as a classifier to classify objects (e.g., computer files) as malware or goodware. The production security module 108 can also perform one or more actions to remediate the malware, such as blocking malicious behavior, quarantining the malware, and removing the malware.

The security server 102 is a hardware device and/or software module configured to generate and distribute the production security modules 108 to the clients 104. The security server 102 is also configured to receive unknown cases from clients 104 or other entities for real-time classification of the cases as malware or goodware. The security server 102 may also classify cases it acquires through other means. The security server 102 may then provide the classification for a case to a client 104 upon request by the client. An example of the security server 102 is a web-based system providing security software and services to the production security modules 108 of the clients 104. Depending on the embodiment, one or more of the functions of the security server 102 can be provided by a cloud computing environment. As used herein, "cloud computing" refers to a style of computing in which dynamically scalable and often virtualized resources are provided as a service over the network 110. Functions attributed to the clients 104 and production security modules 108 can also be provided by the cloud computing environment.

In one embodiment, the security server 102 evaluates different versions of the production security module 108 to determine which version of the security module for production. As mentioned previously, each version of the production security module 108 includes one or more revisions to the production security module 108 that may impact the performance of the production security module. Based on the classification performance (e.g., malware detection) of each version of the production security module 108, the security server 102 selects a version of the security module for production. In one embodiment, the security server 102 selects a version of the security module for production in one or more applications. For example, the selected version of the security module may be implemented at the security server 102 for offline classifications of unknown cases of malware. Alternatively, the security server 102 may provide the selected version of the security module to clients 104 for production. In another example, the selected version of the security module may be implemented in a cloud computing environment where clients 104 query the cloud for classifications of unknown cases.

In one embodiment, the security server 102 evaluates each version of the production security module 108 with respect to a set of test cases created over a measurement period (e.g., past 4 months). Each test case in the set may represent a feature vector of features of any object (e.g., computer files) received by the security server 102 from clients 104 or from other parties for evaluation for malware. The security server 102 divides the set of test cases into a plurality of distinct datasets based on time. By dividing the set of test cases into different datasets that are each associated with a corresponding interval of time and evaluating different versions of the production security module 108 with respect to the different datasets, the security server 102 can identify a version of the production security module 108 that is least susceptible to concept drift for production. Thus, the security server 102 prevents the versions of the production security module 108 that are more susceptible to concept drift from being used in production in different applications.

Note that although the techniques described herein are with respect to evaluating different versions of production security modules 108 to identify a version of the production security module that is least susceptible to concept drift, the techniques may be applied to any field where the target that a classifier is trained to identify changes over time. For example, the techniques herein may be used in media classification (e.g., video, audio, image), fraud detection, weather prediction, shopping behavior, etc.

The network 110 represents the communication pathways between the security server 102, clients 104, and any other entities on the network. In one embodiment, the network 110 is the Internet and uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
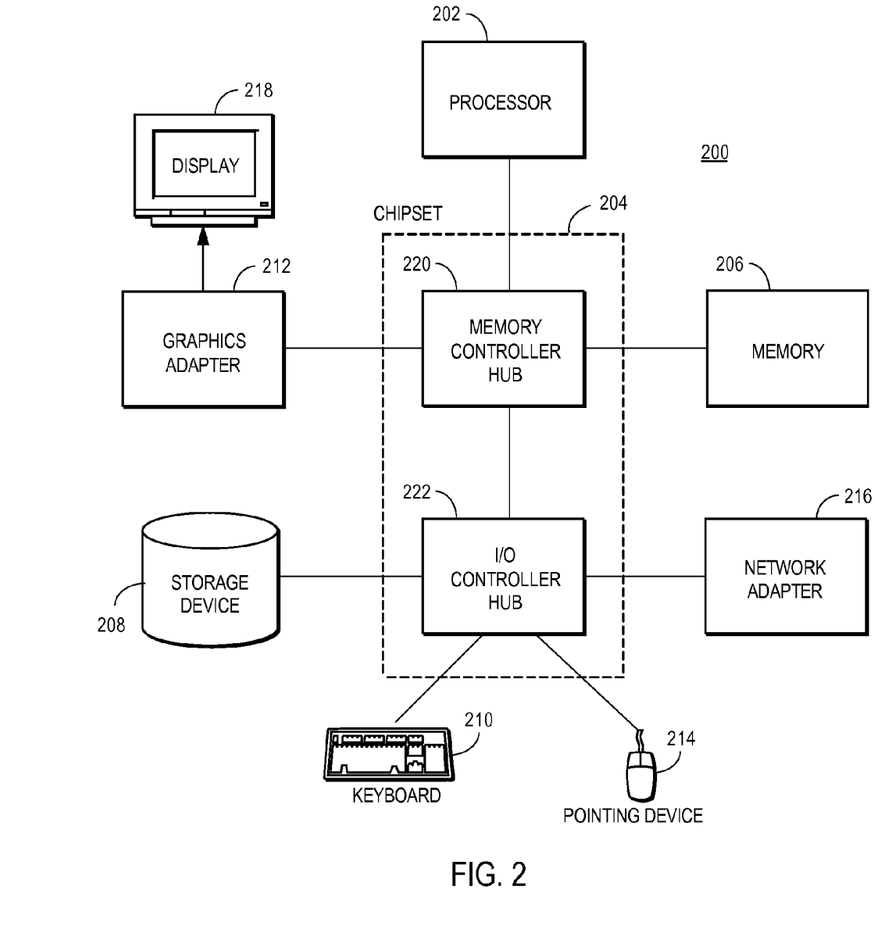
FIG. 2 is a high-level block diagram illustrating a typical computer for use as a security server or client.

FIG. 2 is a high-level block diagram illustrating a typical computer 200 for use as a security server 102 or client 104. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 110.

As is known in the art, a computer 200 can have different and/or other components than those shown in FIG. 2. In addition, the computer 200 can lack certain illustrated components. In one embodiment, a computer 200 acting as a security server is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a non-transitory computer-readable storage medium such as the storage device 208, loaded into the memory 206, and executed by the processor 202.

Figure 3:
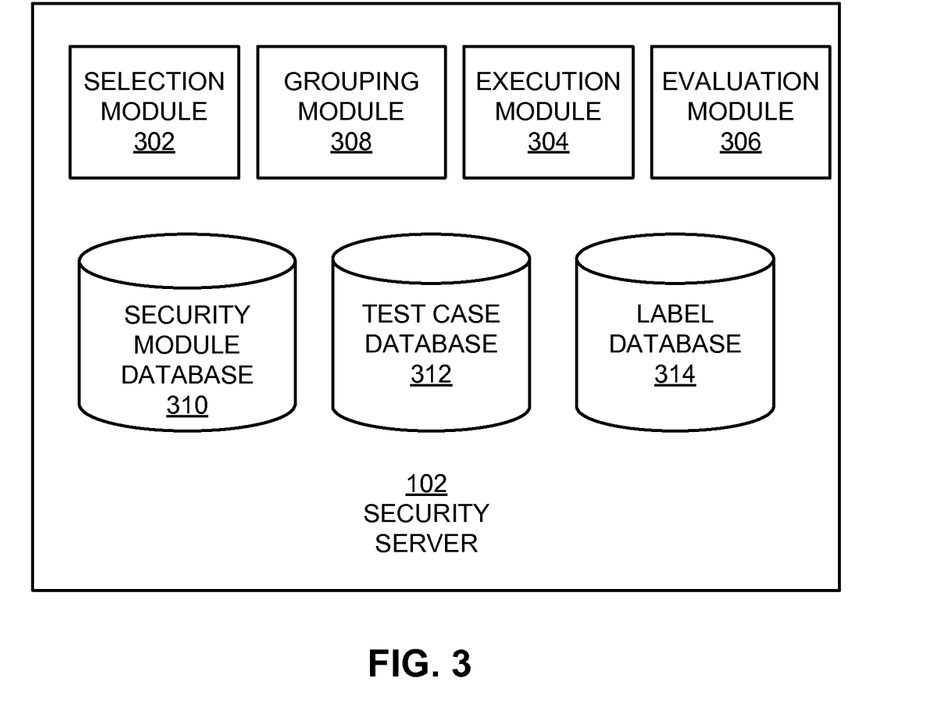
FIG. 3 is a high-level block diagram illustrating a detailed view of the security server according to one embodiment.

FIG. 3 is a high-level block diagram illustrating a detailed view of the security server 102 according to one embodiment. As shown in FIG. 3, the security server 102 includes multiple modules. In some embodiments, the functions are distributed among these modules in a different manner than described herein.

In one embodiment, a security module database 310 stores multiple different versions of the production security module 108 that are each trained to identify malware. Each version of the production security module includes a revision (i.e., a change) to the production version of the security module 108. In one embodiment, a revision includes any change(s) to the production security module 108 that may impact the classification performance of the production security module when classifying objects as goodware or malware. Examples of the revisions may include updates to malware signatures, updates to reputation information used to evaluate whether a particular piece of software is malware, bug fixes, and updated machine learning techniques.

The test case database 312 stores test cases used to evaluate the classification performance of the different versions of the production security module 108 stored in the security module database 310. In one embodiment, a test case comprises a feature vector that represents the features of an object such as word processing files, media files, web pages, executable files, etc. An example feature included in the feature vector for a test case is the age of the object associated with the test file. In one embodiment, the test cases represent feature vectors of objects initially received by the security server 102 from clients 104 and/or from other third parties for classification as malware or goodware. Each test case is associated with a date in which an associated object was initially received for classification.

The label database 314 stores classification labels for the test cases stored in the test case database 312. In one embodiment, each test case is associated with a plurality of labels describing characteristics of the test case. The plurality of labels associated with each test case may include an in-field prediction label and a ground truth label. The in-field prediction label and the ground truth label each indicate whether the test case is goodware or malware. The goodware label indicates that the associated test case is classified as non-malicious. For example, the goodware label may be applied to files from common and/or popular software programs that are frequently present on the clients 104. The malware label indicates that the test case is classified as malware.

In one embodiment, the in-field prediction label describes the classification of the test case as either goodware or malware made when the request was received by the security server 102 to classify a test object associated with the test case. In one embodiment, in-field prediction label is generated by the security server 102 using a production version of the production security module 108 that was in production at the time that the object associated with the test case was received for classification. Note that the in-field prediction label may not necessarily be an accurate classification of the test case.

In one embodiment, the ground-truth label indicates whether the test case is goodware or malware based on an analysis of the test case over an evaluation period (e.g., 3 months). In contrast to an in-field production label for a test case, the ground-truth label for the test case is assumed to be an accurate classification of the test case. Thus, the ground-truth label for a test case may be distinct from the in-field prediction label for the test case.

To determine the ground-truth label for a test case, automated techniques performed by the security server 102 may be applied to the test case over the evaluation period to classify the test case as goodware or malware. Alternatively, a human security analysis may analyze the test case over the course of the evaluation period and assign a ground-truth label indicating the test case as goodware or malware. A combination of manual analysis and automated techniques may also be used to assign a ground-truth label to the test case.

In one embodiment, a selection module 302 selects a set of test cases from the test case database 312 based on time. The set of test cases are used by the security server 102 to evaluate the classification performance of different versions of the production security module 108. In one embodiment, the selection module 302 selects a set of test cases associated with a time interval $T_0$ to $T_1$ relative to the current time $T_2$. The time interval $T_0$ to $T_1$ is an interval of time long enough to ensure that ground-truth labels are available to each test case in the set. For example, time $T_0$ may represent a time period 4 months prior to the current time $T_2$ and time $T_1$ may represent a time 3 months prior to the current time $T_2$ thus defining a 1-month time interval ending 3 months prior to the current time $T_2$. Because the evaluation period required to assign a ground-truth label to a test case is 3 months in one embodiment and time $T_0$ to $T_1$ represents a time period between 4 months to 3 months prior to the current time $T_2$, ground truth labels are available for each of the test cases in the set.

In one embodiment, the selection module 302 selects a test case to include in the set of test cases based on the date in which the an object associated with the test case was received by the security server 102 for classification as goodware or malware. If the object associated with the test case was received for classification by the security server 102 between the time interval $T_0$ to $T_1$, the selection module 302 includes the test case in the set of test cases. Alternatively, the selection module 302 may include only a subset of the test cases received during the time interval $T_0$ to $T_1$ if the number of objects received during the time interval is greater than a threshold (e.g., 1,000 objects). For each test case from the set of test cases, the selection module 302 also retrieves the ground-truth label and in-field prediction label associated with the test case.

In one embodiment, the grouping module 308 groups the selected set of test cases into a plurality of test case datasets based on time. By grouping the test cases into distinct datasets that are each associated with a corresponding time interval, a version(s) of the production security module 108 that is less susceptible to concept drift is more easily identified when different versions of the production security module are executed on the plurality of test case datasets.

To group the set of test cases into the plurality of test case datasets, the grouping module 308 first establishes a plurality of time intervals between $T_0$ to $T_1$. The grouping module 308 may split the time interval $T_0$ to $T_1$ into a plurality of time intervals T0-T0.1, T0.1-T0.2, T0.2-T0.3 through T0.$n$-T1 where n is greater than zero. In one embodiment, each time interval may represent a time period less than the time interval defined by $T_0$ to $T_1$ such as a 1 day time interval, a 5 day time interval, or a 10 day time interval, for example. In one embodiment, the selection module 302 then assigns each test case from the set of test cases to a particular dataset based on the date in which an object associated with the test case was received for classification.

The execution module 304 selects a set of security modules from the security module database 310 for execution against the test case datasets. Each security module in the set of security modules includes one or more distinct revisions or a combination of revisions that are unique to that version of the security module. In one embodiment, the execution module 304 includes security modules in the set that were created after the production security module 108 was released to clients 104. Alternatively, the execution module 304 receives an indication from a human security analyst of the versions of the security module for execution against the test case datasets. In another embodiment, the execution module 304 module selects a set of security modules created within a time period specified by the human security analyst.

In one embodiment, the execution module 304 executes each security module from the set of security modules on the plurality of test case datasets. That is, the execution module 304 applies each security module to each test case in each test case dataset to classify the test case as goodware or malware. In one embodiment, the classification of each test case by a security module includes assigning a prediction label to the test case indicating whether the test case is representative of goodware or malware. Thus, each security module executed by the execution module 304 generates a plurality of prediction labels for the test cases included in the plurality of test case datasets.

The evaluation module 306 evaluates the classification performance of each executed security module. The evaluation module 306 determines the classification performance of each security module 108 according to one or more performance metrics based on the prediction labels assigned to the test cases across the plurality of test case datasets. As will be further described below, the classification performance for each security module 108 may be based on the accuracy of classification of the test cases in each dataset as either goodware or malware. However, other performance metrics may also be used to determine classification performance of each security module in other embodiments. For example, classification performance may be based on a percentage of false positive detection or a percentage of false negative detection. In one embodiment, test cases may be weighted by importance of the objects associated with the test cases. The weight of a test case signifies the importance of correctly classifying the test case as malware or goodware for example. Thus, the classification performance of an executed security module may be based on weighted accuracy, weighted false positive detection, or weighted false positive detection.

In one embodiment, for each security module under evaluation, the evaluation module 308 calculates a classification performance score for the security module with respect to each of the plurality of test case datasets. For each test case dataset, the evaluation module 308 may determine the accuracy of the prediction labels generated by the security module 108 for test cases in the particular dataset. In one embodiment, the evaluation module 208 compares the prediction label for each test case in the dataset to a corresponding ground-truth label for the test case to determine the accuracy of the prediction label for the test case. The comparison indicates whether the security module 108 correctly classified each test case as goodware or malware.

In one embodiment, the evaluation module 308 calculates the classification performance score of a security module with respect to a test case dataset based on a percentage of test cases that the security module correctly classified as malware. By calculating the classification performance score for the security module for each test case dataset, the evaluation module 308 can determine how well the security module performed over time since each test case dataset is associated with a corresponding time interval. For example, given three test case datasets, the evaluation module 308 may determine for a given security module under evaluation a 85 percent accuracy for a first test case dataset, a 80 percent accuracy for a second test case dataset, and a 87 percent accuracy for the third test case dataset. Thus, the evaluation module 308 calculates a plurality of classification performance scores for each security module where each classification performance score corresponds to a particular test case dataset.

In one embodiment, the evaluation module 308 selects a security module from among the plurality of security modules for production based on an overall classification performance score of each security module across the plurality of test case datasets. The evaluation module 308 may select a security module for production in different application such as on clients 104, production on the security server 102, and/or production in a cloud based computing system based on the accuracy of classification and based on variance of the classification accuracy across the plurality of test case datasets. For example, the evaluation module 308 may select a security module with the highest accuracy of classification with minimal variance in classification accuracy across the plurality of test case datasets. Thus, the evaluation module 308 may select a security module that may not produce the most accurate classifications for a given test case dataset, but has stable performance characteristics across the plurality of test case datasets. For example, the evaluation module 308 may select a security module with a 75%, 80,%, and 76% accuracy across three test case datasets compared to another security module with a 95%, 70%, and 50% accuracy across the same three test case datasets because it has less variance in classification accuracy across the three test case datasets. A security module with stable classification performance across the plurality of test case datasets indicates that the security module 108 is less susceptible to concept drift.

To calculate the overall classification performance score for a security module, the evaluation module 308 calculates an average of the classification performance scores for the plurality of test case datasets and weights the average classification performance score based on the variance of the classification performance scores across the test case datasets according to one embodiment. The weight applied to the average classification performance score is inversely proportional to the variance of the classification scores across the plurality of test case datasets. Thus, the evaluation module 308 applies a higher weight to an average classification performance score with lower variance of classification scores across the plurality of test case datasets. Conversely, the evaluation module 308 applies a lower weight to an average classification performance score with higher variance of classification scores across the plurality of test case datasets. In other embodiments, a security analyst may make a manual selection of a security module for production.

In one embodiment, the evaluation module 308 may select a security module for production based on a comparison of the classification performance scores for each security module with the classification performance scores of a previous production version(s) of the security module. The classification performance scores of the previous production versions (s) of the security module describe the classifications made by a security module in production at time $T_0$ or the classifications made by different production security modules between time $T_0$ to $T_1$ if different versions of the security module were in production between time $T_0$ to $T_1$. By comparing the classification performance scores of each security module under evaluation with the classification performance scores of previous production versions of the security module, the evaluation module 108 can determine whether the classification performance of the security module improved or degraded.

To determine the classification performance of each security module with respect to the performance of previous production versions of the security module, the evaluation module 308 calculates a prior classification performance score for the previous production version(s) of the security module. In one embodiment, the prior classification performance score is based on the in-field prediction labels and ground-truth labels assigned to test cases in the plurality of datasets. The prior classification performance score of the previous production version(s) of the security module indicates how well the previous production version(s) of the security module at the time the objects associated with the test cases were received performed in classifying the objects as goodware or malware.

Similar to the calculation of the classification performance score for the security modules under evaluation, the evaluation module 308 calculates the prior classification performance score of the previous production version(s) of the security module for each test case dataset by comparing the in-field prediction labels and the ground-truth labels for the test cases in each dataset. In one embodiment, the classification performance score of the previous production version(s) of the security module with respect to a test case dataset is based on an accuracy of the in-field prediction labels for test cases in the dataset compared to the ground-truth labels for test cases. The evaluation module 308 may generate an overall prior classification performance score for the previous production version(s) of the security module in a similar manner as the overall classification performance score generated for each security module under evaluation.

In one embodiment, the evaluation module 308 compares the overall classification performance score of each security module with the overall classification performance score for the previous production version(s) of the security module. Based on the comparison, the evaluation module 308 determines how the revision made to each security module impacted the classification performance of the security module. That is, the evaluation module 308 can determine whether the overall classification performance of a given security module increased or decreased compared to the classification performance of the previous production version(s) of the security module.

In one embodiment, the evaluation module 308 selects a security module for production based on the comparison of the overall classification performance score of each security module 108 with the overall classification performance score for the previous production version(s) of the security module. In one embodiment, the evaluation module 308 may select a security module that generated an improved classification performance with minimal variance in performance across the plurality of test case datasets. This ensures that the selected security module 108 is less susceptible to concept drift and has better performance than the previous production version(s) of the security module. If the evaluation module 308 determines that all the security modules 108 resulted in decreased classification performance compared to the previous production(s) of the security module, the evaluation module 308 may refrain from selecting a security module for production.

Figure 4:
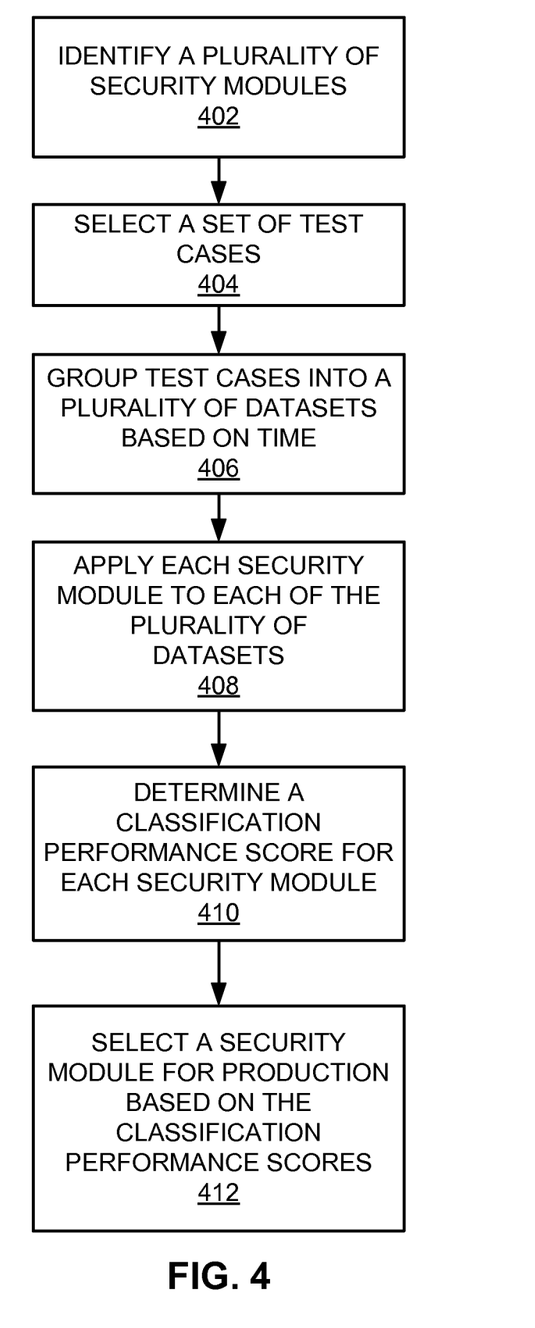
FIG. 4 is a flow chart illustrating steps performed by one embodiment of the security server to identify a security module for production.

FIG. 4 is a flow chart illustrating steps performed by one embodiment of the security server 102 to select a version of the security module 108 for production. Other embodiments can perform different and/or additional steps. Moreover, other embodiments can perform the steps in different orders. Further, some or all of the steps can be performed by entities other than the security server 102.

In one embodiment, the security server 102 identifies 402 a plurality of security modules for evaluation. Each security module represents a different version of the production security module 108 that includes a revision(s) to the production version of the security module 108 implemented on the security server 102 and/or distributed to clients 104.

The security server 102 selects 404 a set of test cases. The set of test cases are used by the security server 102 to evaluate the classification performance of each of the plurality of security modules. In one embodiment, the security server 102 selects test cases based on time. The security server 102 selects test cases for the set that are old enough to ensure that ground-truth labels are available for each test case. In one embodiment, the security server 102 retrieves the ground-truth labels as well as the in-field prediction labels for the test cases in the set.

The security server 102 groups 406 the test cases into a plurality of datasets based on time. The security server 102 determines a plurality of time intervals and assigns each test case from the set of test cases to a dataset of test cases associated with one of the plurality of time intervals. The security server 102 may assign each test case to a particular dataset of test cases based on the time in which the test case was originally received by the security server 102 for classification as goodware or malware.

The security server 102 applies 408 each of the plurality of security modules to each of the plurality of datasets. That is, the security module 102 executes each security module on each test case of each dataset to generate a prediction label for the test case. The prediction label indicates whether the security module classified the test case as goodware or malware.

The security server 102 determines 410 a classification performance score for each security module 109 with respect to the plurality of datasets. In one embodiment, the classification performance score of a security module with respect to a given test case dataset is based on the accuracy of the classifications of test cases in the dataset as being goodware or malware. However, other performance metrics may be used to determine the classification performance of a security module with respect to a test case dataset. The security server 102 selects a security module from among the plurality of security modules 108 for production based on the classification performance scores of the security modules. For example, the security server 102 selects a security module with a classification performance score indicating highest accuracy and least variance of scores.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of selecting a classifier for production, the method comprising:
   identifying a plurality of classifiers;
   selecting a set of test cases based on time;
   grouping the set of test cases into a plurality of datasets based on time, each of the plurality of datasets associated with a different interval of time;
   applying each of the plurality of classifiers to each of the plurality of datasets to generate classifications for test cases in each of the plurality of datasets;
   determining, for each of the plurality of classifiers, a classification performance score for each of the plurality of datasets based on the classifications generated for the test cases of each dataset;
   determining, for each of the plurality of classifiers, a variance across the classification performance scores for the plurality of data sets; and
   selecting a classifier from among the plurality of classifiers for production, the selected classifier having a least amount of variance across the classification performance scores for the plurality of datasets associated with the different intervals of time.

2. The computer-implemented method of claim 1, wherein each of the plurality of classifiers includes one or more distinct revisions to a production version of the classifier, wherein the one or more revisions for a corresponding classifier is unique to the corresponding classifier.

3. The computer-implemented method of claim 1, wherein the plurality of classifiers are malware classifiers for classifying computer files as malware or goodware.

4. The computer-implemented method of claim 1, wherein grouping the set of test cases comprises:
   dividing a period of time associated with the set of test cases into a plurality of different time intervals, each of the plurality of different time intervals associated with one of the plurality of datasets;
   assigning each of the plurality of test cases to one of the plurality of datasets based at least in part on whether the time in which the test case was initially received for classification is within the time interval associated with the dataset.

5. The computer-implemented method of claim 1, wherein applying each of the plurality of classifiers comprises:
   executing each of the plurality of classifiers on test cases included in each of the plurality of datasets to generate a plurality of classifications for the test cases included in each dataset, each of the plurality of classifications describing whether a corresponding test case is associated with a first classification or a second classification.

6. The computer-implemented method of claim 1, wherein determining the classification performance score of each of the plurality of classifiers comprises:
   identifying, for the plurality of datasets, a plurality of first labels for the test cases in each dataset, each first label describing an accurate classification of a corresponding test case as being associated with a first classification or a second classification;
   comparing, for each of the plurality of classifiers, the generated classifications of test cases for each of the plurality of datasets with the plurality of first labels corresponding to the test cases in each of the plurality of datasets; and
   determining, for each of the plurality of classifiers, a classification performance score associated with each of the plurality of datasets based on the comparison.

7. The computer-implemented method of claim 6, further comprising:
   calculating, for each of the plurality of classifiers, an overall classification performance score based on the classification scores associated with the plurality of datasets; and
   selecting the classifier based on the overall classification performance scores.

8. The computer-implemented method of claim 6, wherein selecting the classifier comprises:
   identifying, for the plurality of datasets, a plurality of second labels for the test cases included each dataset, each second label including a classification of a corresponding test case with a first classification or a second classification, the classification performed at a time in which the test case was initially received for classification;
   determining, for a previous production version of the classifier, a classification performance score for each of the plurality of datasets based on a comparison of the plurality of first labels and the plurality of second labels for the test cases in each of the plurality of datasets;
   comparing, for each of the plurality of classifiers, the classification performance scores for the classifier across the plurality of datasets with the classification performance scores the previous production version of the classifier across the plurality of datasets; and
   selecting a classifier with improved classification performance scores across the plurality of datasets with respect to the classification performance scores of the previous production version of the classifier and with least variance of classification performance scores across the plurality of datasets.

9. The computer-implemented method of claim 1, further comprising:
   providing the selected classifier to a plurality of client devices for execution at the plurality of client devices.

10. The computer-implemented method of claim 1, further comprising:
   executing the selected classifier at a server to classify objects.

11. A computer program product comprising a non-transitory computer-readable storage medium including executable code for selecting a classifier for production, the code when executed performs steps comprising:
   identifying a plurality of classifiers;
   selecting a set of test cases based on time;

grouping the set of test cases into a plurality of datasets based on time, each of the plurality of datasets associated with a different interval of time;

applying each of the plurality of classifiers to each of the plurality of datasets to generate classifications for test cases in each of the plurality of datasets;

determining, for each of the plurality of classifiers, a classification performance score for each of the plurality of datasets based on the classifications generated for the test cases of each dataset;

determining, for each of the plurality of classifiers, a variance across the classification performance scores for the plurality of data sets; and selecting a classifier from among the plurality of classifiers for production, the selected classifier having a least amount of variance across the classification performance scores for the plurality of datasets associated with the different intervals of time.

12. The computer program product of claim 11, wherein grouping the set of test cases comprises:

dividing a period of time associated with the set of test cases into a plurality of different time intervals, each of the plurality of different time intervals associated with one of the plurality of datasets;

assigning each of the plurality of test cases to one of the plurality of datasets based at least in part on whether the time in which the test case was initially received for classification is within the time interval associated with the dataset.

13. The computer program product of claim 11, wherein applying each of the plurality of classifiers comprises:

executing each of the plurality of classifiers on test cases included in each of the plurality of datasets to generate a plurality of classifications for the test cases included in each dataset, each of the plurality of classifications describing whether a corresponding test case is associated with a first classification or a second classification.

14. The computer program product of claim 11, wherein determining the classification performance score of each of the plurality of classifiers comprises:

identifying, for the plurality of datasets, a plurality of first labels for the test cases in each dataset, each first label describing an accurate classification of a corresponding test case as being associated with a first classification or a second classification;

comparing, for each of the plurality of classifiers, the generated classifications of test cases for each of the plurality of datasets with the plurality of first labels corresponding to the test cases in each of the plurality of datasets; and determining, for each of the plurality of classifiers, a classification performance score associated with each of the plurality of datasets based on the comparison.

15. The computer program product of claim 11, wherein selecting the classifier comprises:

identifying, for the plurality of datasets, a plurality of second labels for the test cases included each dataset, each second label including a classification of a corresponding test case with a first classification or a second classification, the classification performed at a time in which the test case was initially received for classification;

determining, for a previous production version of the classifier, a classification performance score for each of the plurality of datasets based on a comparison of the plurality of first labels and the plurality of second labels for the test cases in each of the plurality of datasets;

comparing, for each of the plurality of classifiers, the classification performance scores for the classifier across the plurality of datasets with the classification performance scores the previous production version of the classifier across the plurality of datasets; and selecting a classifier with improved classification performance scores across the plurality of datasets with respect to the classification performance scores of the previous production version of the classifier and with least variance of classification performance scores across the plurality of datasets.

16. A computer system for selecting a classifier for production, the computer system comprising:

a processor;

a computer-readable storage medium including executable code, the code when executed by the processor performs steps comprising:

identifying a plurality of classifiers;

selecting a set of test cases based on time;

grouping the set of test cases into a plurality of datasets based on time, each of the plurality of datasets associated with a different interval of time;

applying each of the plurality of classifiers to each of the plurality of datasets to generate classifications for test cases in each of the plurality of datasets;

determining, for each of the plurality of classifiers, a classification performance score for each of the plurality of datasets based on the classifications generated for the test cases of each dataset;

determining, for each of the plurality of classifiers, a variance across the classification performance scores for the plurality of data sets; and selecting a classifier from among the plurality of classifiers for production, the selected classifier having a least amount of variance across the classification performance scores for the plurality of datasets associated with the different intervals of time.

17. The computer system of claim 16, wherein grouping the set of test cases comprises:

dividing a period of time associated with the set of test cases into a plurality of different time intervals, each of the plurality of different time intervals associated with one of the plurality of datasets;

assigning each of the plurality of test cases to one of the plurality of datasets based at least in part on whether the time in which the test case was initially received for classification is within the time interval associated with the dataset.

18. The computer system of claim 16, wherein determining the classification performance score of each of the plurality of classifiers comprises:

identifying, for the plurality of datasets, a plurality of first labels for the test cases in each dataset, each first label describing an accurate classification of a corresponding test case as being associated with a first classification or a second classification;

comparing, for each of the plurality of classifiers, the generated classifications of test cases for each of the plurality of datasets with the plurality of first labels corresponding to the test cases in each of the plurality of datasets; and determining, for each of the plurality of classifiers, a classification performance score associated with each of the plurality of datasets based on the comparison.

* * * * *